Jan. 13, 1948.  F. B. SÖDERSTRÖM  2,434,337
ELECTROMAGNETIC VIBRATION MOTOR
Filed Sept. 10, 1943  3 Sheets—Sheet 1

F. B. Söderström
By Henry C. Parker

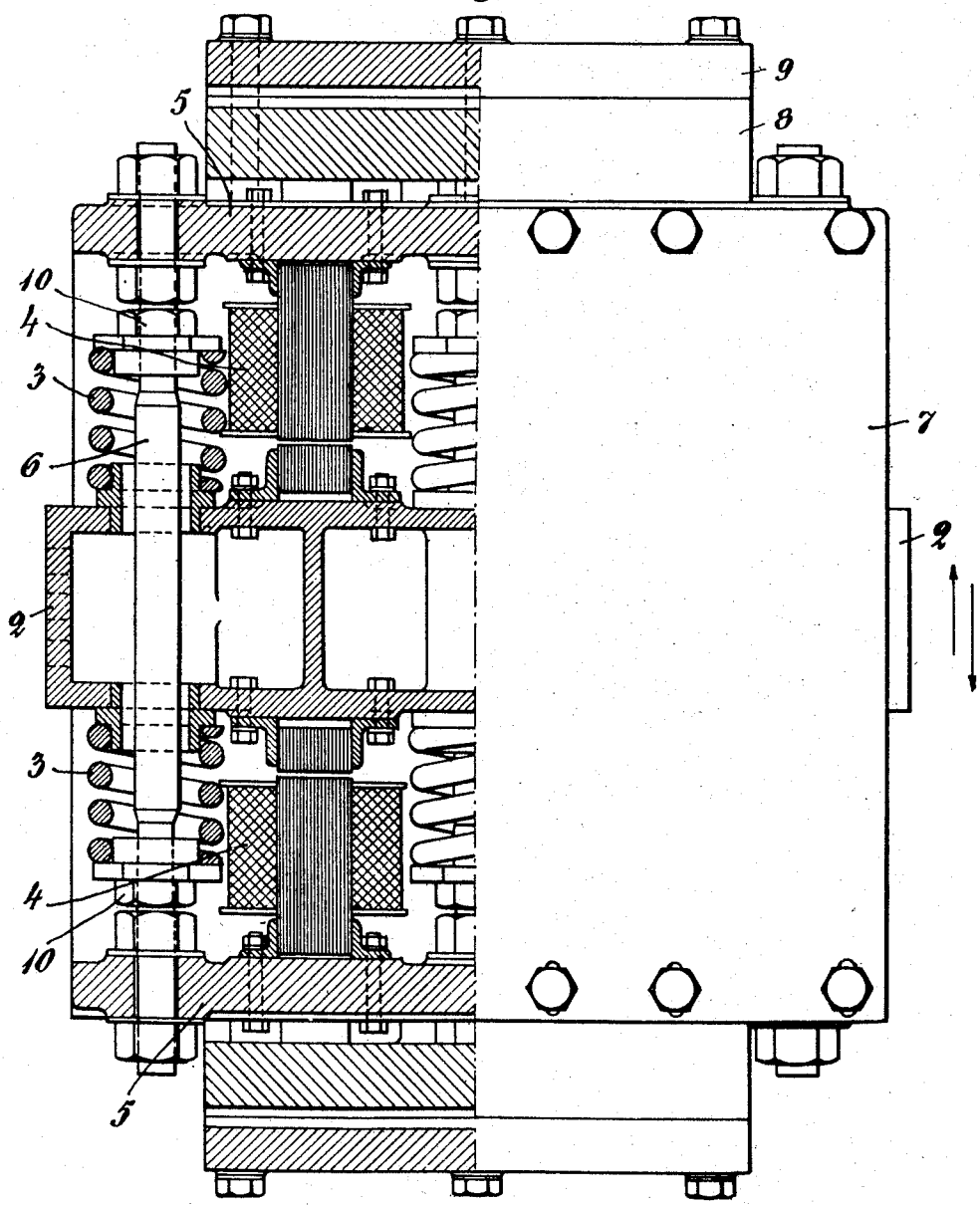

Patented Jan. 13, 1948

2,434,337

UNITED STATES PATENT OFFICE 2,434,337

ELECTROMAGNETIC VIBRATION MOTOR

Folke Bruno Söderström, Linkoping, Sweden, assignor to Vibro-Plus Corporation, New York, N. Y., a corporation of Delaware Application September 10, 1943, Serial No. 501,895
In Sweden July 2, 1942

5 Claims. (Cl. 172—126)

The present invention relates to an electromagnetic reciprocating vibration motor for actuating vibrating screens, conveyors and other vibrating devices. The motor is in principle characterized by the fact that it comprises two or several electro-magnets arranged opposite each other and by means of resilient members connected to an armature, which is alternately influenced by the magnets so that harmonic vibrations are set up in the system.

Figure 1:
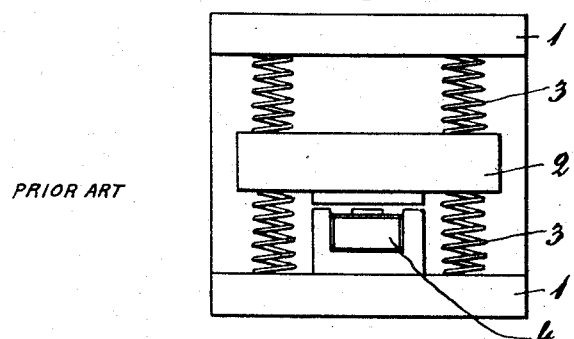
Figure 2:
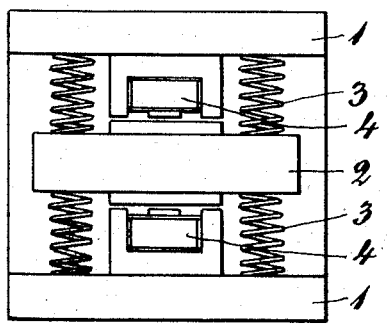
Figure 5:
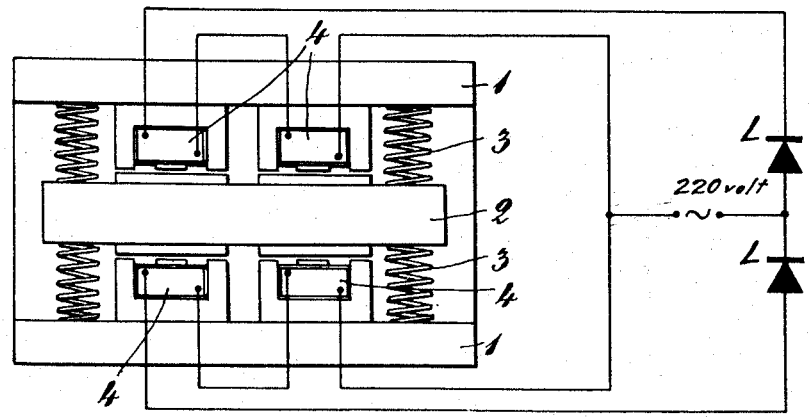
Figure 4:
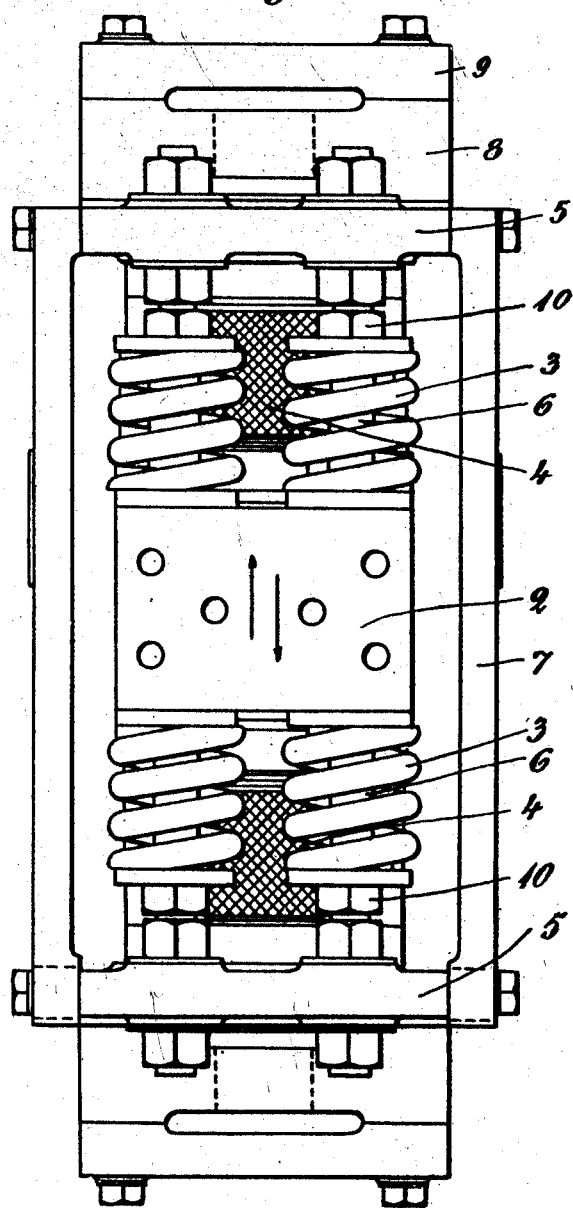

An example of a suitable construction of a motor according to the invention is in the following described with reference to the accompanying drawing in which:

Fig. 1 is a diagrammatic representation of the general principle according to which hitherto known magnetic vibrators, having their magnet and armature mutually connected by resilient means, are arranged. Fig. 2 similarly shows the principle of construction of a vibration motor according to the invention. Fig. 3 is a frontal view of an embodiment of the invention partly in section. Fig. 4 is the same arrangement as in Fig. 3 seen from the side. Fig. 5 is an electric circuit diagram for the vibration motor shown in Figs. 2-4. Similar parts are denoted by the same numerals in all figures.

The known arrangement shown in Figure 1 comprises two oscillating systems 1 and 2, having the masses M and m respectively, and being mutually connected by means of springs 3. The compounded system thus formed by the two swinging masses, in which system 1 is rigidly connected to the electro-magnet 4 and system 2 to the armature of said magnet, possesses a certain given natural frequency, which is determined by the magnitudes of the masses M and m as well as by the spring constants. In order to obtain the highest possible vibration effect (largest amplitude) the natural frequency of the system should harmonize with and preferably be equal to the frequency of the impulsive force which gives rise to the oscillation, i. e., to the magnetic forces set up in the electro-magnet 4, which is rigidly connected to system 1, and which have an influence upon the armature, which is rigidly connected to system 2. To obtain the highest possible efficiency the strength of the magnetic field should vary as nearly equal as possible with the motion performed by the oscillating (vibrating) system. This latter motion may be considered as being practically a simple sine curve.

If the electro-magnet 4, which in the known system diagrammatically represented in Fig. 1, comprises one or several magnets arranged on the same side of the armature and working in parallel, is fed with alternating current, a variation in the magnetic field is obtained which by hysteresis is more or less deformed but in its general form is of the sine type and which thus, more or less, will conform with the curve of oscillation of the mechanical system in question. In view of the fact, however, that the armature is reversely magnetized each time the energizing current of the magnet reverses its direction, the magnetic field-strength will not describe a curve having, more or less, a sine form around a common equilibrium with the mechanical oscillation but will, instead, obtain a form which may be chiefly characterized as a series of wave-halves of the same sign (+ or —) following each other in direct succession. Owing to the more or less pronounced discontinuity of such a curve, its conformity with the mechanical curve of oscillation will always be defective resulting in a poor efficiency of the apparatus.

By eliminating every other of these wave-halves, e. g., by feeding the electro-magnet with pulsating direct current obtained by half-period rectification of ordinary alternating current, it is possible to realize a better harmony between magnetic field-strength and mechanical oscillation, but the number of impulses to which the oscillating system is subjected is at the same time reduced by one-half, since the magnetic field-strength during the whole duration of every other half-period is zero.

By arranging two or several electro-magnets in pairs opposite each other and each connected to its own rectifier in such a manner, that during the first half-period one of the magnets will give an impulse to the system in one direction and during the next half-period the other magnet, opposite the first one, will give an impulse in the opposite direction, the above mentioned disadvantages which are connected with the use of a one-sided magnetic system are eliminated, irrespective of whether this is energized by alternating current or by pulsating direct current.

The effect of the arrangement according to the invention will thus chiefly be the same as if two magnetic systems energized by pulsating direct current would be interlinked in such a manner that the positive half-waves of the one system would supplement the negative half-waves of the other system, so that a continuous magnetic field of force with a sine curved variation would ensue; an effect which, as already explained, can not be realized by using a single electro-magnetic system energized by alternating current. By the invention are thus not only those advantages obtained compared to the one-sided alternating current energized system, which have been mentioned above, but in addition also the effect realized, that a harmonic impulse will be imparted to the oscillating curve of the mechanical system for every half-wave of this, instead of for every other half-wave as in the case of both of the above described one-side acting electro-magnetic systems.

A suitable embodiment of the invention is shown in Figs. 3 and 4. The vibration motor is in this case intended to be firmly attached to a clamp on the apparatus to be vibrated by means of bolts through holes in the armature-bridge 2. To this bridge the armatures for the four electro-magnets 4 are firmly attached. The electro-magnets are firmly attached to the two magnet-plates 5, which are joined opposite each other by means of the bolts 6. The side-plates 7 chiefly serve to protect the magnets and to give sufficient weight (mass) to the system, which also is the function of the weights 8 and the covers 9.

The spring-system connecting the two oscillating systems consists of a number of extensible helical springs 3, suitably ten in number, which may be spanned by nuts 10.

One of the two above mentioned masses of the compounded system will thus consist of the armature-bridge 2 including the armatures fastened to the same, to which in this case comes the mass of the apparatus to which the vibration motor is connected.

The other mass consists of that part of the system which is connected to the other end of the springs, i. e., the four electro-magnets including the plates 5, weights 8, covers 9, side-plates 7, and bolts 6 with nuts. This latter mass should be as large as possible in relation to the other mass, since this makes it possible to obtain larger amplitudes and thus a greater vibrating effect of the latter mass in which the apparatus to be vibrated is comprised.

Normally the vibration motor is intended to be driven by means of two rectifying valves connected in parallel in such a manner that the single phase alternating current is split, with the positive current flowing in one branch and the negative in the other, one branch energizing the electro-magnets on one side of the armature and the other branch energizing the electro-magnets on the opposite side. For this purpose dry rectifiers as well as vacuum tube or mercury rectifiers may be used, but it is also possible to drive the motor by means of a special single-phase generator having a commutator arranged so that the two half-waves are fed to opposing magnets. The connecting of the motor is shown in the circuit diagram in Fig. 5 in which the rectifiers are denoted by letter L. In this case the apparatus may be changed-over for 110 or 220 volts by connecting the two pairs of magnets in parallel or in series. In the circuit shown in the figure they are connected in series for 220 v.

The construction of the vibration motor may evidently be varied in a number of ways without departing from the principle of the invention. Instead of having the form shown in the figures, the armatures may for instance be formed as cores reciprocating in electro-magnetic solenoid coils. It is also evident that the oscillating mass connected to the apparatus to be vibrated, may instead of the armature and the parts firmly combined therewith comprise the electro-magnets, the armature in that latter case being comprised in the free-swinging system. In this case the accessory weights should be combined with the armature instead of, as described, with the electro-magnets, in order that the best proportion between the two oscillating masses and thus a large amplitude and consequently also a high vibrating effect may be realized.

I claim:

1. In an electro-magnetic vibration motor in combination, an armature, at least one pair of electro-magnets rigidly connected and opposing each other on either side of said armature, said armature being combined with the electro-magnets by means of resilient members and arranged to be reciprocated by said electromagnets, means for passing the positive half-waves of an alternating current predominantly through the electro-magnetic system on one side of the armature and the negative half-waves predominantly through the opposing electro-magnetic system, whereby the armature will be attracted in alternation by said system, and means for firmly connecting one of said oscillating systems formed by said armature and electro-magnets to an apparatus to be vibrated the other of said systems being free-swinging in a spring suspension.

2. In an electro-magnetic vibration motor in combination, springs, a plurality of armatures, electro-magnets above and below said armatures arranged to attract the armatures when energized, said electro-magnets and armatures forming two oscillating systems with one supporting the other solely by said springs, and means for energizing the electro-magnets alternately on either side of the armatures, whereby the oscillating system comprising said armatures is caused to oscillate predominantly in harmony with the energizing impulses.

3. In a double-acting electro-magnetic vibration motor in combination, two oscillating masses mutually connected by resilient means, one mass being free-swinging in a spring suspension and the other connected to an apparatus to be actuated by said vibration motor, electro-magnets firmly connected to one of said masses and arranged on both sides of an armature for said electro-magnets, said armature being firmly connected to the other of said masses, the electro-magnets being arranged to be energized alternately on either side of said armature by complementary half-waves of an alternating current.

4. Double acting electro-magnetic vibration motor comprising two resiliently connected oscillating masses one of which is supported solely by extensible springs and able to vibrate freely in a vertical direction and the other arranged to be firmly attached to the apparatus to be vibrated, characterized in that one of said masses is firmly attached to at least two electro-magnets placed opposite each other above and below an armature system which coacts with said magnets and is firmly attached to the other of said masses, said magnets being energized one by the positive and the other by the negative half-wave of a chiefly sine formed alternating current, the resilient means and the masses connected thereby being adjusted so that the natural frequency of the compounded system is in harmony with and preferably equal to the frequency of the alternating current.

5. An electro-magnetic vibration motor comprising at least one pair of electromagnets, said electromagnets being aligned, mechanically connected, arranged in opposed relationship and comprising part of a single vibrating system, at least one armature positioned between and in the magnetic fields of each pair of said electromagnets and forming part of a second vibrating system, means for resiliently connecting said vibrating systems, and means for energizing said electromagnets in such manner that one is energized principally by the positive waves and the other principally by the negative waves of an alternating current, one of said vibrating systems being supported solely by extensible springs and able to vibrate freely in a vertical direction and the other being attached to an apparatus to be vibrated, said connecting means and the masses of said vibrating system being so constructed and arranged that the natural frequency thereof corresponds substantially to the natural frequency of said alternating current.

FOLKE BRUNO SÖDERSTRÖM.

REFERENCES CITED

The following references are of record in the file of this patent:

UNITED STATES PATENTS

| Number | Name | Date |
| --- | --- | --- |
| Re. 19,817 | Wurzbach et al. | Jan. 7, 1936 |
| 1,597,826 | Reynolds | Aug. 31, 1926 |
| 1,672,807 | Etzel | June 5, 1928 |
| 2,163,249 | Sherwen | June 20, 1939 |
| 2,180,189 | Alvord | Nov. 14, 1939 |

FOREIGN PATENTS

| Number | Country | Date |
| --- | --- | --- |
| 421,657 | England | Dec. 28, 1934 |

OTHER REFERENCES

Allis Chalmers Electrical Review, March 1938, pages 28 and 29.